United States Patent Office 2,945,042
Patented July 12, 1960

2,945,042

NICOTINOYL HYDANTOINS

Edgar A. Ferguson, Jr., 150 Woodruff Ave., Brooklyn 26, N.Y.

No Drawing. Filed July 28, 1958, Ser. No. 751,121

6 Claims. (Cl. 260—296)

This invention relates to nicotinoyl derivatives of hydantoins. More particularly the 5 substituted nicotinoyl hydantoin in the mono or dinicotinoyl form is utilized. 5,5-dinicotinoyl, 3 N and 1 N-nicotinoyl hydantoin together with the 1,3,5,5-tetranicotinoyl hydantoin is also contemplated within the scope of this invention.

These hydantoins are particularly useful as sedatives.

As further explanation of the formation of compounds of the present invention the following theoretical discussion is advanced, but not for the purpose of limitation of the specifications and appended claims. The substituted positions at the 5 carbon atom of hydantoin by reason of the extremely labile nature of the H atoms thereto attached form a number of organo derivatives readily when the hydrogen is replaced by sodium by refluxing with sodium ethylate and later a chloride in suitable organic solvent is reacted with the mono or di 5,5 sodium salt of hydantoin. If the 5,5 substituted positions are blocked by sodium then this 5,5-disodium hydantoin may react with sodium ethylate under reflux conditions to form the 5,5-disodium, 1 N- and 3 N-disodium hydantoin. This will react with a chloride to form the corresponding derivative. It has been found in accordance with the present invention that nicotinyl may be substituted.

Hydantoin has the following structure:

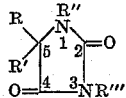

The reaction of nicotinoyl chloride with 5,5'-disodium hydantoin is represented as follows:

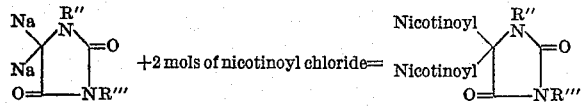

Further reactions may be illustrated as follows:

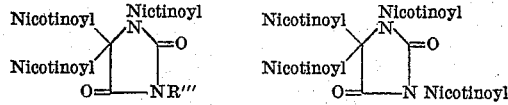

Thus the 5,5, 1 N, 3 N derivatives of hydantoin may successively be formed with nicotinyl chloride.

The following examples are given by way of further explanation of the reaction and processes for manufacturing the same. They are not in any way to be limiting in regard to the specifications and appended claims. Those skilled in the art will find other methods of preparation which may be suitable to form the products of this invention.

Example 1

To 144 grams of 5,5-disodium hydantoin add 141 grams of nicotinoyl chloride in a flask containing 200 ml. of benzene with 200 ml. of chloroform. The filtrate is separated to remove the sodium chloride. The mixture is refluxed for one-half hour at 70° C. The precipitate is removed by filtration. The organic solvent may be removed by boiling under partial vacuum. The product of this reaction is 5,5-dinicotinoyl hydantoin.

Example 2

To 166 grams of 5,5', 1 N-trisodium hydantoin add 262 grams of 5,5 dinicotinoyl hydantoin. Reflux for one-half hour at 70° C. Remove the sodium chloride by filtration and the organic solvents by distillation under partial vacuum. The product of this reaction is 5,5 1 N-tri-nicotinoyl hydantoin.

Example 3

To 245 grams of 5,5 3 N-trinicotinoyl hydantoin in a beaker with 400 cc. of benzene, add 141 grams of nicotinyl chloride. Stir thoroughly. Transfer to a reflux flask and reflux for one-half hour at 70° C. Remove the precipitate of salt by filtration and the organic solvent by distillation in partial vacuum. The product of this reaction is 5,5, 3 N, 1 N-tetranicotinoyl hydantoin.

Example 4

To 5,5-diethyl 3 N, 1 N-disodium hydantoin (200 grams) in 400 cc. of chloroform add 282 grams of nicotinoyl chloride. Reflux at 75° C. for one-half hour. Filter to remove sodium chloride. Distill off the organic solvent at lowered pressure. The product of this reaction is 5,5-diethyl, 3 N, 1 N-dinicotinoyl hydantoin.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. As a new composition of matter, a compound selected from the group consisting of 5-nicotinoyl, 5-phenyl hydantoin, the sodium salt thereof, 5-nicotinoyl, 5-ethyl hydantoin, the sodium salt thereof, 5,5-dinicotinoyl hydantoin, the sodium salt thereof, and 5,5, 1 N, 3 N-tetranicotinoyl hydantoin.

2. As a new composition of matter 5-nicotinoyl, 5-phenyl hydantoin.

3. As a new composition of matter 5-nicotinoyl, 5-ethyl hydantoin.

4. As a new composition of matter 5,5-dinicotinoyl hydantoin.

5. As a new composition of matter, the sodium salt of 5-nicotinoyl, 5-phenyl hydantoin.

6. As a new composition of matter, the sodium salt of 5,5-dinicotinoyl hydantoin.

No references cited.